(12) United States Patent
de Koning

(10) Patent No.: US 8,341,876 B2
(45) Date of Patent: Jan. 1, 2013

(54) ENRICHING THE SEED QUALITY OF A BATCH OF SEEDS

(75) Inventor: Jacques Rene Alphons de Koning, Dinteloord (NL)

(73) Assignee: Monsanto Holland B.V., Enkuizen (NL)

( * ) Notice: Subject to any disclaimer, the term of this patent is extended or adjusted under 35 U.S.C. 154(b) by 0 days.

(21) Appl. No.: 13/196,254

(22) Filed: Aug. 2, 2011

(65) Prior Publication Data

US 2012/0023815 A1    Feb. 2, 2012

Related U.S. Application Data

(63) Continuation of application No. PCT/NL2010/050046, filed on Feb. 3, 2010.

(60) Provisional application No. 61/149,516, filed on Feb. 3, 2009.

(30) Foreign Application Priority Data

Feb. 3, 2009 (EP) .................................. 09151990

(51) Int. Cl.
*A01C 1/00* (2006.01)
(52) U.S. Cl. ........................................................ 47/1.3
(58) Field of Classification Search ............... 47/1.3; 209/1, 3
See application file for complete search history.

(56) References Cited

U.S. PATENT DOCUMENTS

| 4,062,765 A * | 12/1977 | Fay et al. ........................ 209/1 |
| 4,602,716 A | 7/1986 | Barla-Szabó et al. |
| 4,765,486 A * | 8/1988 | Berlage et al. .................. 209/8 |
| 2011/0049017 A1* | 3/2011 | Rem et al. ........................ 209/3 |
| 2012/0023815 A1* | 2/2012 | De Koning ..................... 47/1.3 |

FOREIGN PATENT DOCUMENTS

| GB | 207886 | 12/1923 |
| GB | 733218 | 7/1955 |
| GB | 819367 | 9/1959 |

OTHER PUBLICATIONS

PCT/NL2010/050046 International Preliminary Report on Patentability, 2010.
International Search Report relating to corresponding PCT/NL2010/050046, 2010.

* cited by examiner

*Primary Examiner* — Frank T Palo

(57) ABSTRACT

The invention is directed to a method for separating two or more seed fractions having different germination quality, to a method for preparing a seed fraction enriched in seed quality, and to the use of a magnetic field. The method for separating two or more seed fractions having different germination quality comprises: mixing a feed of seeds comprising seeds with at least two densities with a magnetic fluid thereby obtaining a mixture, and applying a magnetic field to the mixture such that the mixture is exposed to a magnetic gradient so as to separate two or more seed fractions with different densities.

21 Claims, 4 Drawing Sheets

ENRICHING THE SEED QUALITY OF A BATCH OF SEEDS

RELATED APPLICATION DATA

Figure 1:
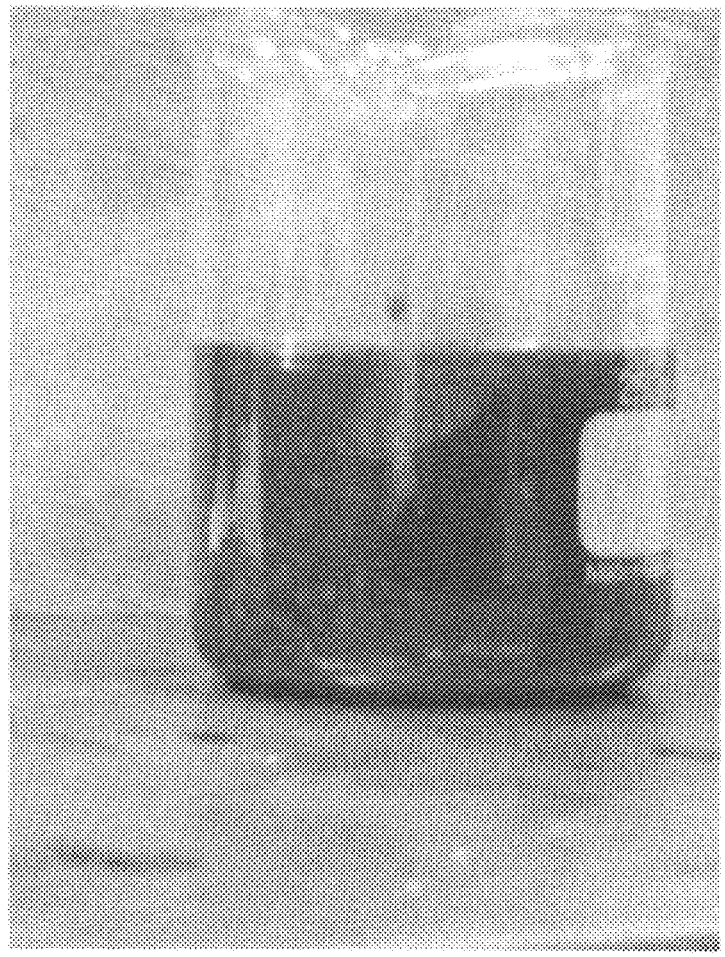

This application is a continuation of PCT application number PCT/NL2010/050046 designating the United States, filed on Feb. 3, 2010, which claims the benefit of EP patent application number 09151990.3, filed on Feb. 3, 2009 and U.S. Provisional patent application No. 61/149,516, filed on Feb. 3, 2009, all of which are hereby incorporated by reference in their entireties.

FIELD OF THE INVENTION

The invention is directed to a method for separating two or more seed fractions having different germination quality, to a method for preparing a seed fraction enriched in germination quality, and to the use of a magnetic fluid.

BACKGROUND OF THE INVENTION

Batches of seed normally have a quality distribution, and also include low quality seeds, in particular seeds with low germination quality. The presence of such seeds devalues the batch of seeds. However, the detection and removal of low quality seeds from a batch of seeds is not a trivial task.

Barla-Szabo et al. (U.S. Pat. No. 4,602,716) describe a process for determining the germinative ability of sowing seeds based on detecting the characteristic difference between acoustic excitation response functions of right and damaged seeds. The invention is however only suitable for large-scale sorting of seeds, e.g. between "good" and "bad". Furthermore the process requires an acoustically closed space and equipment to analyse the difference in acoustic signal of the different seeds.

It has previously been recognised that in particular the germination quality has a correlation with the density of the seed. This can be used as a tool for the improvement of seed batches. For instance, Taylor et al. describe a method for separating seeds in a liquid, wherein the density of the liquid phase in which the seeds are present is controlled by mixing in liquids with different densities (typically, such liquid comprise unhealthy and environmentally hazardous organic solvents), or solutions having a pre-determined amount of dissolved compounds (Taylor et al. in *J. Amer. Soc. Hort. Sci.* 1985, 110, 347-349).

In the method described by Taylor et al., however, the seed batch can only be fractionated in two fractions, i.e. one fraction having a density lower than the density of the liquid and one fraction having a density higher than the liquid.

It has been found, however, that seeds with different densities can differ in germinating properties in a non-linear and unpredictable correlation. The correlation can also be different for various types of seeds. Hence, in order to identify the particular correlation between the seed densities and the germination properties a batch of seeds of a particular seed type, it is required to separate the batch of seeds in multiple fractions, which fractions are then analysed for their germination properties. Using the above described method of Taylor et al. this involves multiple separations wherein for each separation a liquid with a different density is used. Accordingly, the assessment of the correlation between the seed densities and the germination properties with the above described method is rather involved and requires a relatively large number of process steps. Accordingly, the processing time of this method is relatively long.

Furthermore, the use of organic solvents in order to set the density of the liquid is undesirable in view of health and environmental issues.

Object of the invention is therefore to provide an improved method that allows separating two or more seed fractions having different germination capacity.

Further object of the invention is to provide an improved method for enriching a feed of seeds in quality such as high germination capacity.

The inventors now found that one or more of these object can be met by a method in which fractions of seeds with different densities are separated in a magnetic fluid in a magnetic field thereby creating a magnetic gradient.

Methods to separate seeds based on magnetism are known, see e.g GB 207,886, GB 819,367, GB 733,218 and U.S. Pat. No. 4,765,486. However these methods separate different kinds of seeds from each other or soil and/or dirt from seeds. None of these methods separate the same seeds from each other based on the quality of the seeds.

Accordingly, in a first aspect the invention is directed to a method for separating two or more seed fractions having different seed quality comprising:
  mixing a feed of seeds, said feed comprising seeds with at least two different densities, with a magnetic fluid, thereby obtaining a mixture; and
  applying a magnetic field to said mixture such that the mixture is exposed to a magnetic gradient so as to separate two or more seed fractions with different densities.

The invention is based on the underlying idea that the quality of the seeds is correlated to the density of the seeds. The method of the invention advantageously requires only one separation step of mixing the seeds with the liquid and thereby considerably shortens processing speed, but nevertheless allows the separation of multiple fractions of seeds having different densities. It is surprising that the density gradient in the magnetic fluid (brought about by the gradient in force of the magnetic field, herein also referred to as the magnetic gradient) can be set sufficiently accurate and sufficiently small in order to satisfactorily separate the seeds with low germination quality from the seeds with high germination quality. This accuracy of the claimed method allows to separate seeds with different germination quality wherein the seeds are from the same kind. Thus one batch of the same seeds, but with different germination quality can be separated. To be able to separate seeds with lower germination quality from seeds with better germination quality has enormous commercial impact, The term "seed quality" includes reference to "germination capacity", "germination energy", "germination rate", "stress resistance", "vitality" and "vigour". A desired seed quality can for instance be a high stress resistance. This means that the seed also exhibits a good germination in geographical areas with a prevalent temperature outside the range of 20-25° C. This may be of advantage to certain plant varieties which, for instance, are going to be grown in Mediterranean or (sub) tropical regions, or cooler (e.g. boreal) regions. Conversely, a desired seed quality may be that the yield of usable plants is high, even so high that virtually every sown seed results in a usable plant. This may be at the expense of the germination energy, but will increase the monetary value per seed significantly.

The term "germ" as used herein can refer to the embryo in the mature seed.

The term "seedling" refers to the young plant grown from seed.

The terms "germinate" and "germination" as used herein refer to the first stage in the development of a plant from seed, in particular the time at which the radicle breaks through the seed coat and/or pericarp.

The term "germination capacity" as used herein refers to the percentage of seeds that after a defined period (e.g. 7 days) under optimum conditions give a full seedling. For determining the germination capacity a representative sample is needed. Sampling and the method of determining the germination capacity are described in the handbook for sampling of the International Seed Testing Association (ISTA). The optimum temperature for germination of tomato seed is 23° C. A high germination capacity of the seed does not by definition mean a high field emergence. A better measure for that is the vigour. Investigating germination capacity under unfavourable ambient conditions (e.g. an increased or reduced temperature) can provide information on the vigour of the seed.

The "germination energy" is a measure for the rate of germination and the vitality of the seed. The germination energy is normally determined in the same manner as the germination capacity, but in a shorter period (e.g. 3 days). Seed has a high germination energy if a radicle emerges from a high percentage of the seeds. Germination energy accordingly concerns solely the capacity of the seed to germinate, whereas germination capacity refers to the capacity of the seed to grow well, after germination, into a small seedling. Research into the germination energy under unfavourable or suboptimal ambient conditions (e.g. an increased or reduced temperature) can provide information on the stress resistance of the seed.

The term "stress resistance" or "stress tolerance" as used herein refers to the capacity of seed to come to germination under suboptimal conditions or after shorter or longer periods of unfavourable conditions. Measurement of the stress resistance of seed can be done by determining the germination energy under suboptimal conditions.

The term "germination rate" refers to the period (in days or hours) within which up to 50% of seeds come to germination.

The term "vigour" is normally used to refer both to the capacity of the seed to germinate under suboptimal (stress) conditions and to the capacity of the seed to germinate and to grow out to form an autotrophic seedling under suboptimal conditions. As such, the term hence encompasses the germination energy as well as germination capacity under suboptimal conditions. It is pointed out with emphasis that the term "vigour" as used herein refers to the capacity of seed under suboptimal conditions still to exhibit a good germination and to grow out into an autotrophic seedling and crop, i.e. germination capacity under suboptimal conditions. As used herein, the term relates to germination capacity in the same way as stress resistance relates to germination energy.

The term "usable plant" refers to a plant which is not an abnormal plant and for that reason is usable for commercial growth. An abnormal (tomato) plant is characterized by a seedling that is very small (<50% in length) with respect to the average size, with major damage on any plant part or without a visible apical growth tip or any other feature as mentioned in ISTA Handbook on Seedling Evaluation, Section 15, Seedling Type E—Seedling Group A-2-1-1-1.

In principle any type of seeds can be used as feed. The present invention is especially suitable for batches with only one type of seeds. However, in order to enrich the feed of seeds in germination quality in accordance with the present invention, it is required that the feed of seeds comprises seeds with at least two different densities. Normally, however, the feed of seeds has a distribution of different densities. Good results have been obtained with seed feeds comprising one or more selected from the group consisting of seeds of tomato, pepper, egg plant, fennel, brassica, carrot and leek.

In principle any seed may be used, and seed used in aspects of the invention include, but are not limited to seed of vegetables such as artichokes, kohlrabi, arugula, leeks, asparagus, lettuce (e.g., head, leaf, romaine), bok choy, malanga, broccoli, melons (e.g., muskmelon, watermelon, crenshaw, honeydew, cantaloupe), brussels sprouts, cabbage, cardoni, carrots, napa, cauliflower, okra, onions, celery, parsley, chick peas, parsnips, chicory, Chinese cabbage, peppers, collards, potatoes, cucumber plants (marrows, cucumbers), pumpkins, cucurbits, radishes, dry bulb onions, rutabaga, eggplant, salsify, escarole, shallots, endive, garlic, spinach, green onions, squash, greens, beet (sugar beet and fodder beet), sweet potatoes, swiss-chard, horseradish, tomatoes, kale, turnips, and spices, as well as fruit and vine crops such as apples, apricots, cherries, nectarines, peaches, pears, plums, prunes, quince almonds, chestnuts, filberts, pecans, pistachios, walnuts, citrus, blueberries, boysenberries, cranberries, currants, loganberries, raspberries, strawberries, blackberries, grapes, avocados, bananas, kiwi, persimmons, pomegranate, pineapple, tropical fruits, melon, mango, papaya, and lychee, as well as crop plants (row crops) such as evening primrose, meadow foam, corn (field, sweet, popcorn), hops, jojoba, peanuts, rice, safflower, small grains (barley, oats, rye, wheat, etc.), sorghum, tobacco, kapok, leguminous plants (beans, lentils, peas, soybeans), oil plants (rape, mustard, poppy, olives, sunflowers, coconut, castor oil plants, cocoa beans, groundnuts), fiber plants (cotton, flax, hemp, jute), lauraceae (cinnamon, camphor), or plants such as coffee, sugarcane, tea, and natural rubber plants.

The term "feed" as used herein refers to a batch or lot of seed of arbitrary size i.e., consisting of any multiple number of seeds. Preferably, the feed consists of one type of seeds, e.g. seeds of one plant species.

The magnetic fluid can suitably be a fluid that comprises magnetic particles. In view of health and environmental issues it is preferred that the fluid is an aqueous fluid, such as an aqueous suspension. Examples of magnetic particles that can be used to provide a fluid with magnetic properties include iron oxide particles (such as $Fe_2O_3$ and $Fe_3O_4$ particles), cobalt oxide particles, cobalt oxide particles, chromium oxide particles, nickel oxide particles. Preferably, the magnetic fluid comprises iron oxide particles. The magnetic particles can suitably have an average particle diameter in the range of 1 nm to 1 mm, preferably 10 nm-100 µm.

The magnetic fluid can suitably have a concentration of magnetic particles in the range of 0.001%-99%, preferably 0.1%-50%. The concentration used may depend of the density required. Vegetable seed such as tomato seed can be separated in a density brought about by a concentration of between 1%-5%. Preferably the magnetic particles are coated so that they do not stick together under the influence of a magnetic field. Such coated particles are commercially available. The magnetic fluid can further comprise one or more additives. Suitable fluids include commercially available ferrofluids such as for instance available from Ferrotec GmbH, Unterensingen, Germany.

Mixing of the feed of seeds and the magnetic fluid can be achieved in many ways. Preferably, the mixing does not involve magnetic stirrers as these could interfere with the magnetic gradient. Consequently, it is preferred to use a mechanical mixer, such as a mechanical stirrer. The mixing can suitably be performed in a mixing container. It is preferred to use a mixing container that has an aspect ratio of its longer dimension to its shorter dimension of more than 1, preferably 1.5 or more, more preferably 2 or more, such as 3 or more or 5 or more. In a preferred embodiment, the longest dimension is the height of the container.

The amount of seed fed into the magnetic fluid can suitably be at least 0.1 g/l of magnetic fluid. Preferably, the amount of seeds in the magnetic fluid does not exceed 1000 g/l of magnetic fluid, because this may lead to unsatisfactory separation due to geometrical hindrance of different seeds.

The method of the invention further comprises the application of a magnetic field in order to establish a magnetic gradient in the magnetic fluid. The magnetic field can for instance be applied using a permanent magnet, an electromagnet and/or a superconductive magnet. In order to have a good control over the magnetic gradient, the magnetic field is preferably applied using an electromagnet.

The general principle of separation based on density in a magnetic medium is known from U.S. Pat. No. 4,062,765. This principle can be used in aspects of the invention.

Suitable magnets for use in aspects of the present invention that are capable of generating a density gradient in a magnetic fluid are for instance disclosed in EP 1878505 and EP 1800753. The magnet may for instance be a magnet that is a dipole magnet, more preferably a cylindrical dipole magnet. A suitable strength is for instance a magnetic field strength of about 0.001-1, more preferably 0.10-0.15 Tesla at the location of the magnetic fluid. The magnetic field may also be a rotating magnetic field as described in WO 0040336.

The magnetic field may be applied after mixing the feed of seeds with the magnetic fluid, but it is also possible that the magnetic field is applied simultaneously with mixing the fluid.

Most seeds have a distribution of densities which typically lies in the range of 600-1500 kg/m$^3$. Therefore, the density of said magnetic fluid in said magnetic gradient is preferably in the range of 600 kg/m$^3$ to 1500 kg/m$^3$. The density range of the magnetic fluid in the magnetic gradient may depend on the type of seeds in the seed feed. Depending on the type of seeds to be enriched in germination quality, the density of the magnetic fluid in the magnetic field can for example be in the range of 600-900 kg/m$^3$, in the range of 800-1100 kg/m$^3$, in the range of 1000-1300 kg/m$^3$, in the range of 1200-1500 kg/m$^3$, in the range of 600-1100 kg/m$^3$, or in the range of 1000-1500 kg/m$^3$.

By applying the magnetic field such that the mixture of seeds and magnetic fluid is exposed to a magnetic gradient, two or more seed fractions can be separated by virtue of their different densities, which are typically representative for different germination qualities. The term separation in this context is meant to refer to the situation wherein seeds with different densities float at different relative positions in the magnetic gradient. Preferably, the magnetic field is applied such that 2 to 10 seed fractions with different densities are separated. Still more preferably, the largest number of seeds is present in one of the middle fractions, that is fractions 4-7 in a total of 10 consecutive fractions, or fraction 3 in a total of 5 consecutive fractions.

It can be advantageous to stop the mixing action and let the seed fractions with different densities float at specific positions of the mixture under the influence of the magnetically-induced density gradient in order to avoid inaccuracies due to twirling, vortexes and/or turbulence in the fluid.

In a further aspect the invention is directed to a method for preparing a seed fraction enriched in germination quality comprising:

separating two or more seed fractions having different germination quality according to the method of the invention described above;

testing said two or more seed fractions for germination quality; and collecting one or more seed fractions having a higher germination quality than one or more other seed fractions to obtain a seed fraction enriched in germination quality.

This method advantageously allows enriching a feed of seeds in germination quality by identifying and removing one or more specific fractions that have lower germination quality than other fractions of the feed of seeds. The method is especially suitable for fractions of one type of seed, even for fractions of seeds of one plant species. Moreover, the inventors found that the obtained seed fraction enriched in germination quality can be dried using conventional methods and have similar viability as the feed of seeds before the method of the invention. The seed fraction obtained with the method of the invention will typically result in more homogeneous and more reliable germination as compared with the original feed of seeds.

In accordance with the method for preparing a seed fraction enriched in germination quality, the two or more seed fractions are tested for their respective germination quality. Such testing can for instance comprise one or more testing methods selected from GE (Germination Energy), MGT (Mean Germination test), TPL (Top Paper Light test), UTP (Usuable TransPlant test). Such protocols are well known in the art. Reference is made specifically to the protocols provided in the handbook "International Rules for Seed Testing" issued by the International Seed Testing Association (ISTA). Naturally, the two or more seed fractions can also be tested for other qualities, such as seed health, physical and genetical purity, etc.

In a further step, one or more seed fractions that have been identified to have a higher germination quality than one or more other seed fractions are collected to obtain a seed fraction enriched in germination quality. This collection can for instance be carried out by removing one or more seed fractions which are identified to have a lower germination quality than one or more other seed fractions thereby maintaining a mixture comprising one or more seed fractions that are enriched in germination quality as compared to the original feed of seeds. As exemplified in the Examples below, in case of a beaker test, floating seeds can be removed by removing the liquid containing them, which results in removal of the entire surface layer of the liquid (for instance about 0.5-1 cm). This removal exposes the next fraction of floating seeds that was originally below the surface layer. This next fraction can then be removed. Alternatively, openings in the side of the beaker can be used to draw out specific sub-surface fractions using for instance a tubing connected to a vacuum pump.

The process can be scaled up to commercial level by using a flow process, wherein seeds are added to a feed stream of magnetic fluid, in which fluid a density gradient is generated essentially perpendicular to the fluid flow by passing said fluid along a magnet, whereby the seeds are allowed to distribute over the fluid according to their density (i.e. to a position in the fluid that corresponds to their density), and whereafter the seeds are either split into fractions having different density, or wherein seeds at a specific density are collected, for instance by using a splitter in the fluid flow. In case of the lab scale machine a splitter of 10 funnels placed on top of each other, collect the seeds floating at that level. These and other embodiments can be easily realised by standard engineering and optimization.

The fluid flow that passes the magnet may suitably have a flow rate of 0.00001-10 m/s, preferably 0.01 to 1 m/s.

The collected one or more seed fractions can suitably be washed and/or dried.

The invention advantageously allows the separation of seeds with relatively small density differences. In an embodiment, the density of the one or more seed fractions having a higher germination quality differs at most 50 kg/m$^3$ from the density of the one or more other seed fractions, preferably at most 30 kg/m$^3$, more preferably at most 20 kg/m$^3$. The identification of a large number of seed fractions (such as 5-10) having such relatively small density differences provides a precise control of removing only those seeds that have specific lower germination quality than other seeds, thereby maintaining the portion of good quality seeds as high as possible.

In case the two or more seed fractions with different densities have been tested also for other properties than germination quality, naturally such properties can also be used as further selection criteria for improving the quality of the seed fraction that is finally obtained.

It is preferred that the obtained seed fraction enriched in germination quality has a retention time in the magnetic liquid of at most 1 minute, preferably at most 30 seconds, and more preferably the feed seed has a retention time in the magnetic liquid of at most 30 seconds. If the retention time of the seeds in the magnetic fluid is very long, it is possible that the seeds take up liquid (such as water). This can have an influence to the density of the seeds. Accordingly, relatively short retention times, such as those mentioned above, ensure accurate separation of seeds with different germination qualities.

In an advantageous embodiment of the invention, magnetic fluid is recovered from the collected seed fractions and recycled. Thus, the magnetic fluid can for instance be extracted from the collected seed fractions (including the seed fractions having higher germination quality as well as the seed fractions having lower germination quality) and thereafter be reused for mixing with seed feed.

In a particularly advantageous embodiment, the method of the invention is conducted in a continuous mode.

In a further aspect the invention is directed to the use of a magnetic fluid as described herein as a tool for enriching a feed of seeds in germination quality.

The invention will now be further illustrated by means of the following Examples.

EXAMPLES

Example 1

Beaker Test Tomato

In this test a representative seed sample (about 20-30 grams) from a commercial test lot of tomato seeds was mixed with a diluted (3% in water) ferromagnetic fluid (Ferrofluid, Ferrotec; www.ferrotec.com) in a beaker glass and the solution subjected to a magnetic field by placing the beaker on top of a permanent magnet. The mixture was left to rest and the seeds were allowed to level within the solution according to their density (see FIG. 1).

When the mixture appeared equilibrated (seeds remained at their position undisturbed) the seeds were collected in fractions. Each time the seeds that floated on the surface were collected together with the fluid in which they floated, hence a small amount of the fluid was removed each time. The seeds then floating at the surface (those that were previously floating just beneath the surface), were then collected and so on until all fractions were collected. The seeds were washed and dried and tested in standard germination tests as for example a TPL20/30 according to the International Seed Testing Association for their germination quality (FIG. 2).

Figure 2:
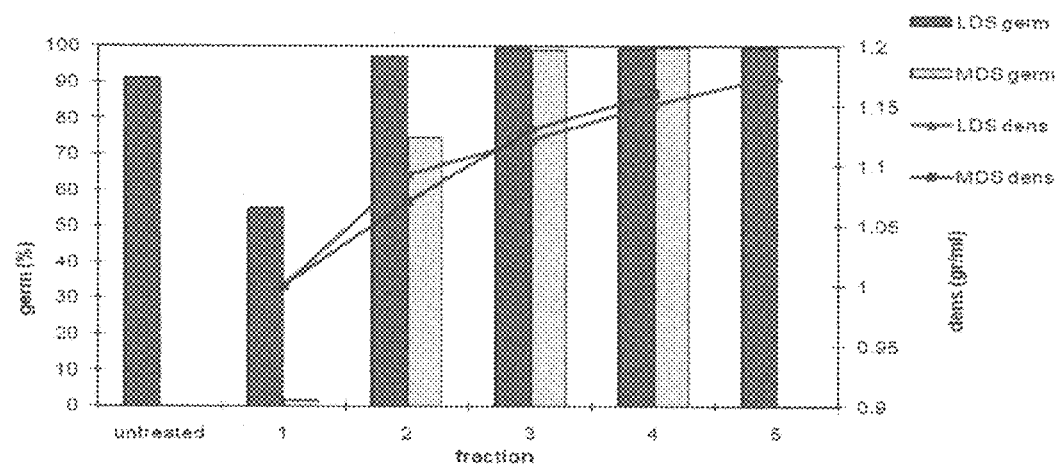

FIG. 2 shows that although the germination quality of the untreated seeds is already good (90%), removal of the seeds in the fraction with the lightest density which has a germination of around 55% increased the germination of the rest of the seeds to between 97 and 100%.

In FIG. 2 it is also I shown that there is almost no difference between a LDS performed by repeated steps of a LDS with solutions of different densities when separating the same batch of seeds.

Example 2

Small Lab Scale MDS Sorter

In this test a representative seed sample (about 20-30 grams) from a commercial test lot of tomato seeds was mixed with about 250 ml a diluted (3% in water) ironoxide suspension (Ferrofluid, Ferrotec; www.ferrotec.com). The mixture was allowed to flow passed a magnetic field so that a laminar density gradient was formed perpendicular to the direction of the flow. The flow rate was selected to allow the seeds to distribute according to their density in the laminar density gradient. Subsequently, the mixture was separated by 10 separators placed on top of each other along the density gradient, representing the different densities in the gradient starting with the highest density nearest to the magnet, and the individual fractions were transported to collectors where the seeds were harvested, washed and dried.

Figure 3:
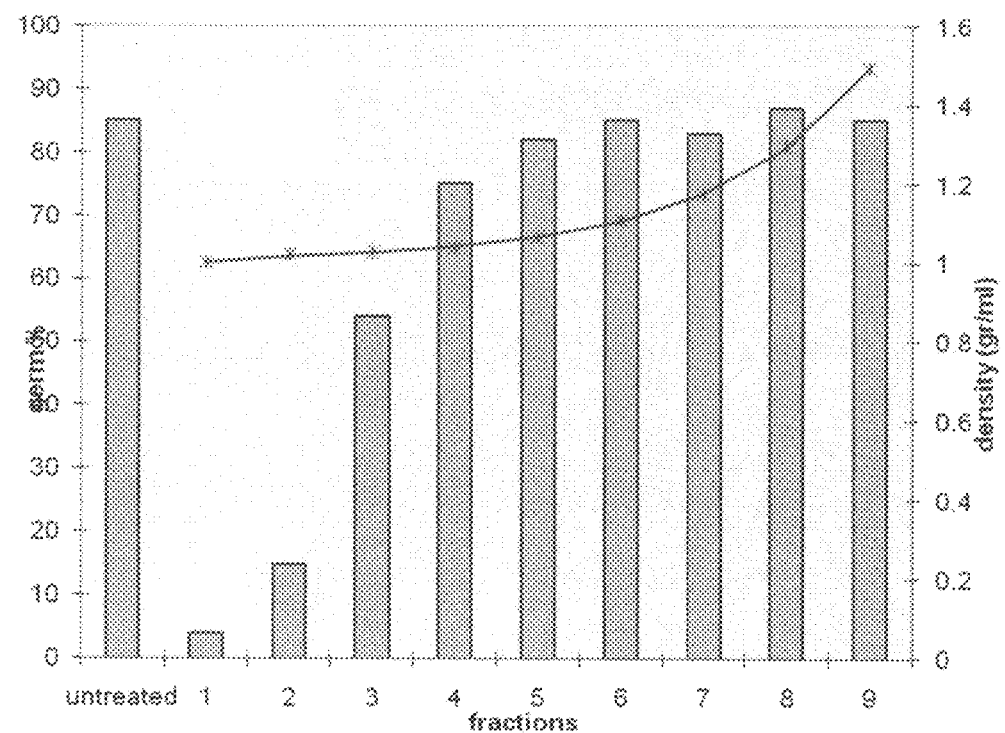

The seeds were again tested in standard germination tests as for example a TPL20/30 according to the International Seed Testing Association for their germination quality (see FIG. 3).

The results are compared to the MDS results from the beaker glass and with repeatedly LDS results performed at different densities.

From the results it is clear that also with this flow-type separator it is possible to distinguish fractions representing seeds of the different densities which differ in germination quality and which can be separated in a stream of magnetic fluid using a flow-type process.

Example 3

Lab Scale Separator Tomato Rootstock

Figure 4:
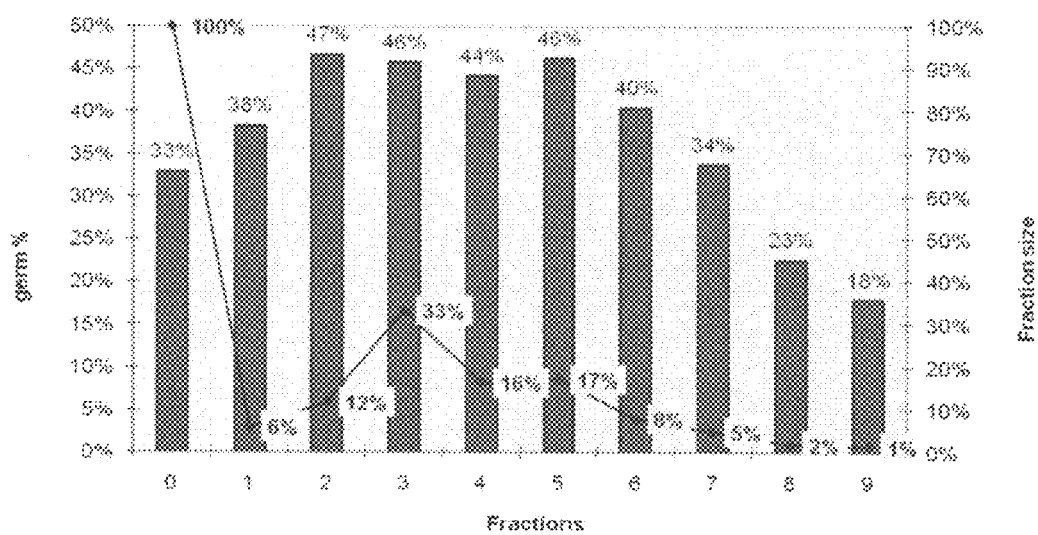

In this test Example 2 was repeated with tomato rootstock seeds (Maxifort) (FIG. 4).

It is shown that in this case also better germination can be obtained with fractions with seeds of a particular density and that total germination of the batch can be improved by removing fractions with bad germinating seeds, which represent only a small amount of the untreated batch.

In this case it is also shown that poorly germinating seeds can be encountered in fractions with different densities. In particular, in this case the fractions with the lowest densities as well the fractions with the highest densities exhibited the poorest germination.

The test has been performed on seeds of many crops as pepper, egg-plant, brassica etc. with good results.

LEGENDS TO THE FIGURES

FIG. 1: tomato seeds levelling in a ferro-oxide solution within a magnetic field according to their density.

FIG. 2: Magnetic density separation (MDS) and liquid density separation (LDS) results for untreated (non-separated) seeds and seeds collected at different density fractions.

FIG. 3: MDS lab scale separator (MDS 2) results for germination of seeds that are separated at certain density.

FIG. 4: germination results and fraction sizes of an untreated fraction (0) and fractions collected from a lab scale MDS separator of a tomato rootstock batch.

What is claimed:

1. A method for separating two or more seed fractions having different seed quality comprising:
    mixing a feed of seeds, said feed comprising seeds with at least two different densities, with a magnetic fluid, thereby obtaining a mixture; and
    applying a magnetic field to said mixture such that the mixture is exposed to a magnetic gradient that generates a density gradient in the magnetic fluid wherein seeds with different densities float at different relative positions in said density gradient so as to separate two or more seed fractions with different densities.

2. The method according to claim 1, wherein said magnetic fluid comprises iron oxide particles.

3. The method according to claim 1, wherein the density of said magnetic fluid in said magnetic field ranges from 600 kg/m3 to 1500 kg/m3.

4. The method according to claim 1, wherein the magnetic field is applied such that 2 to 10 seed fractions with different densities are separated.

5. The method according to claim 1, wherein said magnetic field is applied using one or more selected from the group consisting of a permanent magnet, an electromagnet, and a superconductive magnet.

6. The method according to claim 1, wherein said feed of seeds consist of one kind of seeds.

7. The method according to claim 1, wherein said feed of seeds comprises one or more seeds from vegetable seeds or row crop seeds.

8. The method according to claim 1, wherein said magnetic fluid is an aqueous fluid.

9. The method according to claim 1, wherein said seed quality is a member selected from the group consisting of vitality, germination rate, germination energy, germination capacity, stress resistance and vigour.

10. The method according to claim 1, wherein said seed quality is a member selected from the group consisting of germination rate, germination energy, and germination capacity.

11. A method for preparing a seed fraction enriched in seed quality comprising:
    separating two or more seed fractions having different germination quality by mixing the two or more seed fractions with a magnetic fluid and applying a magnetic field to the two or more seed fractions such that the two or more seed fractions are exposed to a magnetic gradient that generates a density gradient in the magnetic fluid wherein seeds with different densities float at different relative positions in said density gradient so as to separate two or more seed fractions with different densities;
    testing said two or more seed fractions for germination quality; and
    collecting one or more seed fractions having a higher germination quality than one or more other seed fractions to obtain a seed fraction enriched in germination quality.

12. The method according to claim 11, wherein the obtained seed fraction enriched in seed quality has a retention time in the magnetic liquid of at most 1 minute.

13. The method according to claim 11, wherein the obtained seed fraction enriched in seed quality is further washed and/or dried.

14. The method according to claim 11, wherein the density of said one or more seed fractions having a higher germination quality differs at most 50 kg/m3 from the density of the one or more other seed fractions.

15. The method according to claim 11, further comprising recovering magnetic liquid from the collected seed fractions and recycling said recovered magnetic liquid.

16. The method according to claim 11, wherein said two or more seed fractions are from one type of seed.

17. The method according to claim 11, wherein said method is performed in continuous mode.

18. The method according to claim 11, wherein the testing for seed quality comprises performing one or more germination tests selected from the group consisting of GE (Germination Energy), MGT (Mean Germination test), TPL (Top Paper Light test), UTP (Usuable TransPlant test).

19. The method according to claim 11, wherein the obtained seed fraction enriched in seed quality has a retention time in the magnetic liquid of at most 30 seconds.

20. The method according to claim 11, wherein the density of said one or more seed fractions having a higher germination quality differs at most 30 kg/m3 from the density of the one or more other seed fractions.

21. The method according to claim 11, wherein the density of said one or more seed fractions having a higher germination quality differs at most 20 kg/m3 from the one or more other seed fractions.

* * * * *